United States Patent [19]

Penna

[11] Patent Number: 5,828,381

[45] Date of Patent: Oct. 27, 1998

[54] VARIABLE DISPLAY RATE IMAGE CODING

[75] Inventor: David E. Penna, Redhill, England

[73] Assignee: U.S. Philips Corporation, New York, N.Y.

[21] Appl. No.: 556,690

[22] Filed: Nov. 13, 1995

[30] Foreign Application Priority Data

Dec. 8, 1994 [GB] United Kingdom ............... 9424809

[51] Int. Cl.⁶ .......................................... G06T 3/00
[52] U.S. Cl. .......................................... 345/473
[58] Field of Search ................... 348/384, 390, 348/400, 403; 382/232, 235; 463/29–33; 345/124, 473

[56] References Cited

U.S. PATENT DOCUMENTS 4,928,252  5/1990  Gabbe et al. ........................ 364/519
5,347,308  9/1994  Wai ..................................... 358/133 X
5,592,574  1/1997  Chilton et al. ...................... 382/295

Primary Examiner—Almis R. Jankus

[57] ABSTRACT

A method and apparatus are provided to enable variable speed play of motion-prediction coded sequences of video signal frames. Prior to encoding, input image frames (S1,S2) are reduced in size with further image frames (M1,M2) being formed, each including two or more of the spatially reduced input image frames. Following decoding of the motion-prediction coded sequence of further image frames, display image update rates greater than the image decoding rate by a factor determined by the ratio of input sequence frames to a further image frame may be achieved. Particular applications of the method and apparatus are in interactive display systems where image update rates may be varied under user control.

13 Claims, 3 Drawing Sheets

VARIABLE DISPLAY RATE IMAGE CODING

The present invention relates to the encoding and decoding of digital video image frame sequences particularly, but not exclusively, for interactive systems where a decoded image display rate is required to be variable under direct or indirect user control.

BACKGROUND OF THE INVENTION

An interactive system may be, for example, a car racing video game where the player controls the speed of the car. With a coded image sequence providing a view from the car, the speed of play of the image sequence should depend on the speed of the car.

A simple technique would be to vary the rate at which decoded frames are presented for display. In some systems such as Compact Disc interactive (CD-i) it is possible to run the decoder in a single step mode so that the controlling application program can trigger the display of new source frames at rates up to the display output frame rate. This would allow, for example, half speed display by triggering the single step mechanism at every other display output frame scan, giving the effect that every frame in the input sequence appears for two output frames. Some display rates will require a simple pattern such as this where a new input image is triggered once in every N output frames. In other cases the pattern will be more irregular so that, for example, the pattern might be to move from the first input image to the second after two output frame times, from the second to the third after three frame times and from the third to the fourth also after three frame times. This sequence, if repeated, would give an overall rate of three input frames used during every eight output frames, which gives a ⅜ speed play. If the required speed of play is not a simple fraction such as this then there may be no regular repeating pattern.

This technique has limitations. Considering a system designed for European TV display as an example, this may have a maximum decode rate of 25 frames per second. If we wish to simulate a car which has a maximum speed of 100 kmh then the rate at which new frames of data will be presented will be 12.5 Hz at a simulated speed of 50 kmh and 2.5 frames per second at a simulated speed of 10 kmh. The effect of this will be very jerky movement at low speed.

The jerkiness may be reduced by having the maximum decode rate correspond to, say, half maximum speed and skipping frames at speeds above this. This technique is inappropriate, however, where the image sequence has been encoded using motion prediction techniques: whilst the motion prediction allows a reduction in the amount of data required to code a frame from the image sequence where there is data defining similarities between the frame and other frames in the sequence, skipping frames will lead to errors in frames which are based on them. This applies particularly to image sequences coded according to the MPEG standard.

The MPEG standard recognises three types of pictures (frames) namely intra-pictures, predicted pictures and interpolated pictures, generally referred to as I-, P-, and B-pictures respectively. A typical MPEG picture sequence is shown in FIG. 1 of the accompanying drawings. I-pictures are specifically intended to provide access points for random pictures and as such they are coded complete, with only limited compression. P-pictures are coded with reference to a past (I or P) picture and often form a reference for future P-pictures. B-pictures have the highest degree of compression but require both a past and future reference for their generation. From this can be seen how the technique of skipping frames will lead to errors, especially if it is an I- or P-picture frame which is dropped.

Whilst it is possible in principle to decode all frames of a sequence at faster than the display device frame rate and then select only some for display, practical decoders tend to have a limit on decoding rate at the display device rate (such as the 25 Hz rate mentioned above). There may also be a limit on the bandwidth of the coded data channel which is delivering input data to the decoder which will place a further limit on the rate at which frames are presented for display, regardless of whether all frames are decoded or some are skipped.

SUMMARY OF THE INVENTION

It is therefore an object of the present invention to provide, inter alia, a method of encoding which reduces the above-mentioned problems of jerky images at low sequence display rates and skipping frames from predictively coded sequences at relatively higher display rates.

In accordance with the present invention there is provided a method for encoding a sequence of video images comprising the steps of:

a) for each of n successive image frames, where n is an integer greater than 1, spatially compressing the frame to less than or equal to 1/n times its original area; and b) arranging the n spatially compressed frames in a non-overlapping manner in a further image frame;

wherein steps a) and b) are performed for successive groups of n images of the video image sequence to be encoded, and the resultant sequence of further image frames is then encoded using a predetermined image sequence coding scheme.

By reducing the size of the frames and forming them into further (multiple image) frames prior to encoding will result in reduction of the amount of data it is necessary to transmit. Also, where there is a degree of consistency between successive frames (as with a moving image sequence) and the arrangement of spatially compressed frames is the same from further frame to further frame, further reduction may be obtained by using, for the sequence coding scheme, a predictive coding scheme suitably according to the MPEG standard.

Also in accordance with the present invention there is provided a method of decoding a sequence of video images encoded by the above-recited method and comprising the steps of:

a) decoding the encoded sequence, according to the predetermined coding scheme, to recreate the sequence of further image frames;

b) determining a desired display image refresh rate; and c) generating a constant frame rate display image sequence by selecting one or more compressed image frames from each further image frame in dependence on the desired display image refresh rate.

As will be recognised, by obtaining two or more compressed frames from the decoding of one further frame eases the problems of jerky images and skipping frames, particularly for predictive coding schemes. By obtaining the compressed frames at up to n times faster than the decoder full frame decoding rate, the displayed image update rate at which each of the (compressed) images is to be displayed in order (the threshold rate) is 1/nth that for the case where skipping frames is impractical leading to an n times increase in the update rate for desired image rates below the threshold.

The present invention further provides encoding and decoding apparatuses embodying this coding scheme, together with further features of the methods of encoding and decoding, as defined in the attached claims, to which reference should now be made.

Further features and advantages of the present invention will become apparent from reading of the following description of preferred embodiments of the invention, by way of example only, with reference to the accompanying drawings in which:

DESCRIPTION OF PREFERRED EMBODIMENTS

Figure 1:
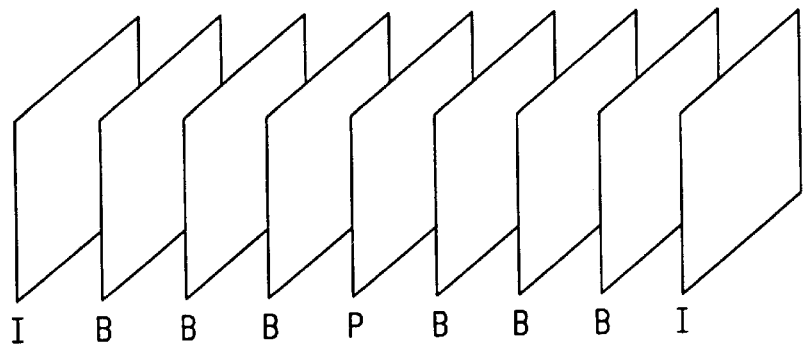
FIG. 1 schematically represents a conventional video frame sequence according to the MPEG standard.
Figure 2:
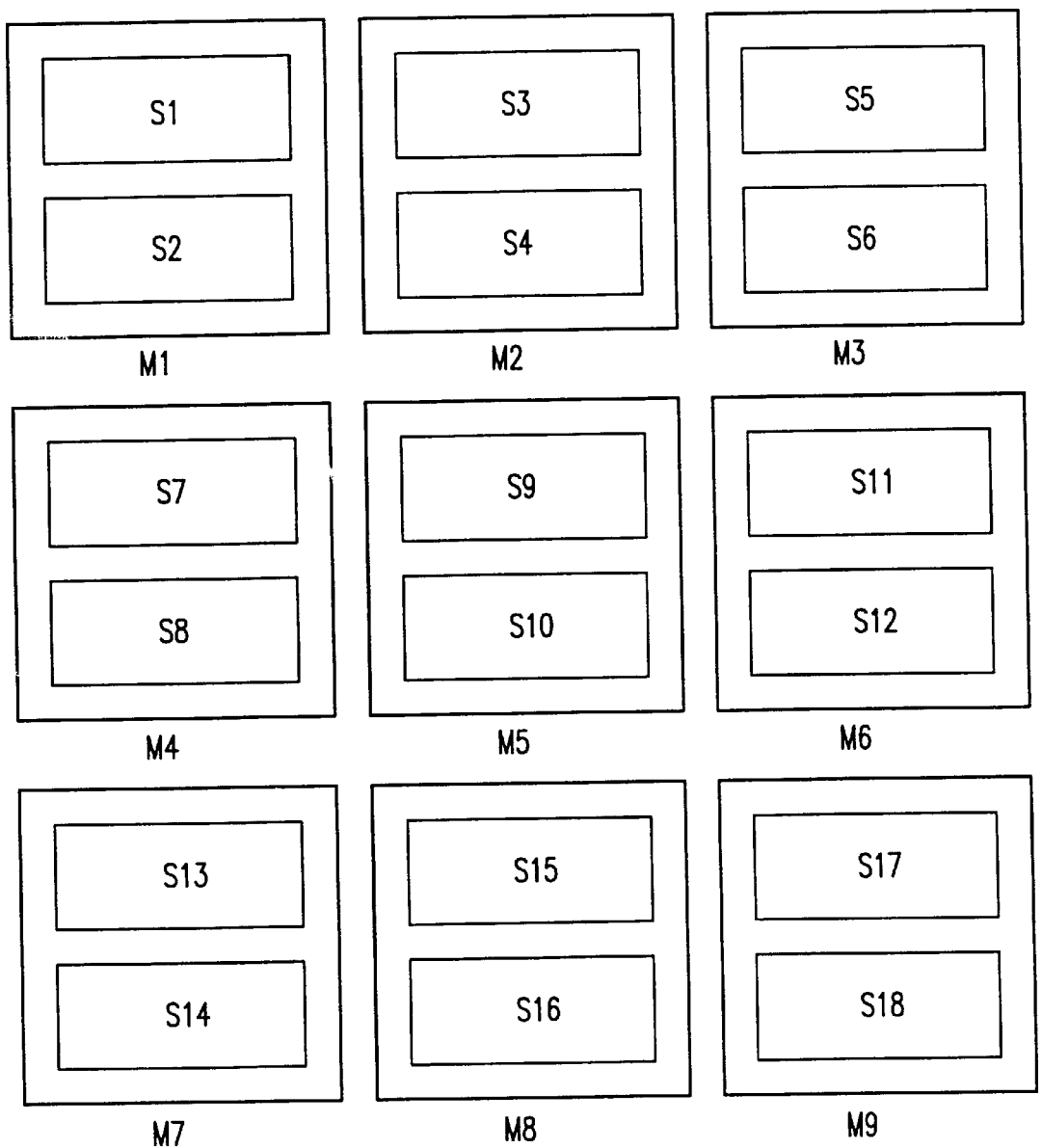
FIG. 2 represents a modified frame sequence according to the present invention.

The basic idea behind the present invention is to increase the effective maximum frame rate from the encoder/decoder system by dividing each input frame into two or more spatially smaller frames. The technique also allows image frames to be skipped without disturbing an MPEG decoding scheme. This is illustrated in FIG. 2 which shows the first nine coded MPEG frames of such a sequence. It can be seen that each (further) frame is divided into two parts, with each part having one image from the sequence. Thus M1, the first MPEG coded frame, has the first two images from the sequence (S1 and S2) contained within it. M2, the second MPEG coded frame, has the third and fourth images from the input sequence (S3 and S4), and so on. It will be appreciated that this technique requires the decoder which makes these images available for display to have the capability to select part of the image for display, as will be described below.

If the system is to run at normal speed then input MPEG coded frames (M1,M2 etc) are decoded at a rate of one half the output frame rate. On alternate output frames the source of the display image is swapped between the top and bottom halves of the image. Taking the sequence illustrated in FIG. 2 then for the first displayed output frames the top half of M1, the bottom half of M1, the top half of M2 and so on will be displayed. The result is that input sequence images S1, S2, S3, S4 and so on will be displayed in the correct sequence.

Figure 3:
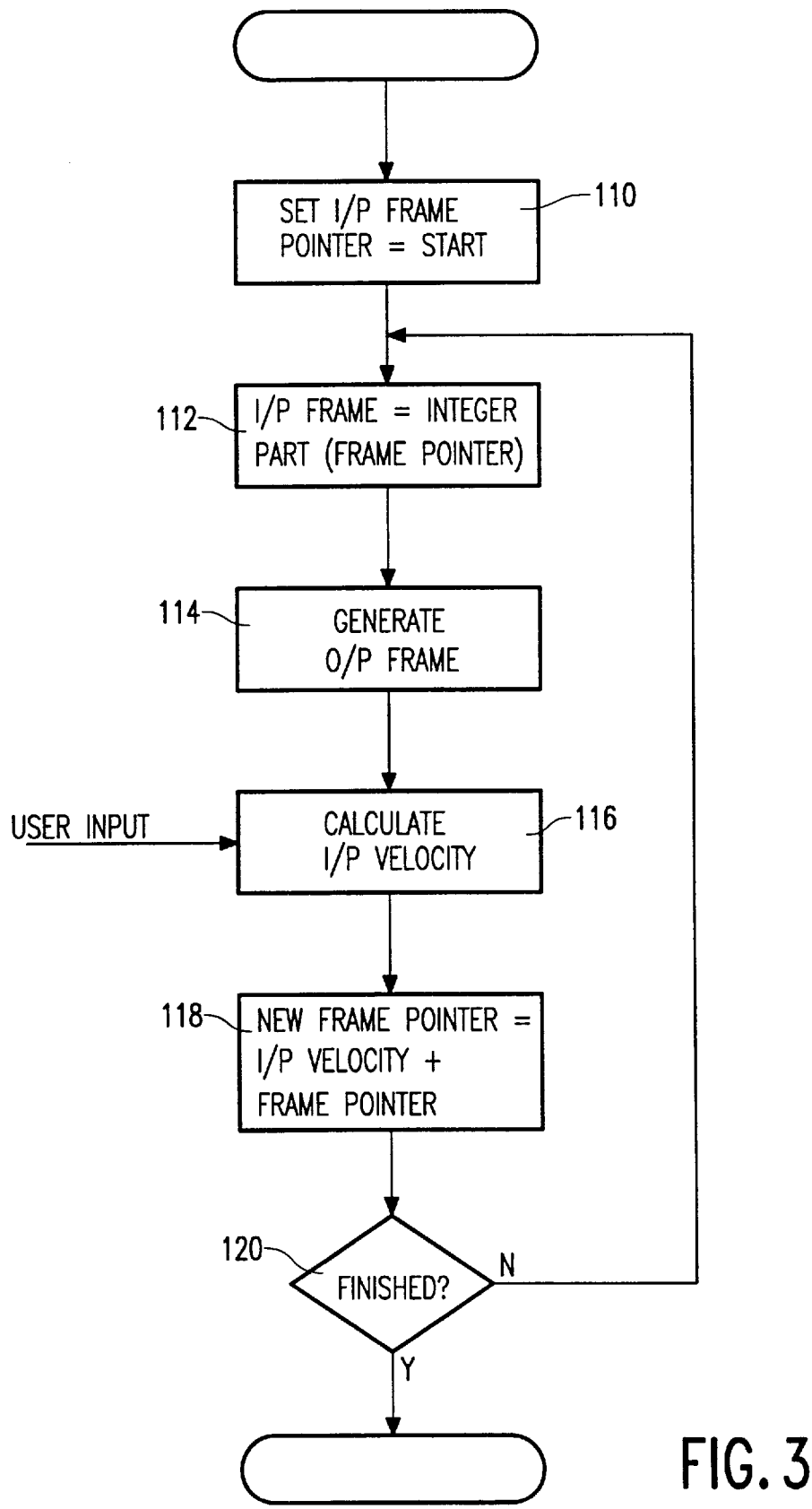
FIG. 3 is a flow chart representing output frame selection.

When running the system at speeds (image update rates) other than normal, it becomes necessary to either repeat input sequence images (for lower speeds) or selectively skip images (for higher speeds). The maximum that can be achieved where n input images are packed into an MPEG frame is n times normal image update rate, without disturbing the MPEG decoding sequence as described previously. A suitable technique for selecting the appropriate sequence of output frames will now be described with reference to the flow chart of FIG. 3.

The first step 110 comprises setting a current input frame pointer to a starting position in the input image sequence. As this starting position value may not be a whole number, the next step 112 is to take the integer part of the frame pointer value to specify a first input frame. From this first input frame, the first output frame is generated (with repositioning and/or resizing of the image as desired) at step 114.

To determine the next frame it is first necessary to calculate the input velocity value (at step 116) based on user input, in order to determine the output frame update rate. The input velocity value (which is the number of input frames used in producing one output frame and is not usually an integer) is then added to the frame pointer at step 118 and, unless the sequence is completed (determined at step 120), the procedure loops back to step 112 where the integer part of the frame pointer plus input velocity value determines the next input frame to be output.

Some examples of the selection of input sequence images selected for different displayed image update rates is given in Table 1 below, with reference to the two input sequence images per MPEG frame arrangement of FIG. 2.

TABLE 1

| Output Frame | MPEG Data Displayed at Rate × Normal Update | | | | |
|---|---|---|---|---|---|
| Number | Rate = ⅓ | Rate = ⅔ | Rate = 1 | Rate = 1½ | Rate = 2 |
| 1 | S1 | S1 | S1 | S1 | S1 |
| 2 | S1 | S1 | S2 | S3 | S3 |
| 3 | S1 | S2 | S3 | S4 | S5 |
| 4 | S2 | S3 | S4 | S6 | S7 |
| 5 | S2 | S3 | S5 | S7 | S9 |
| 6 | S2 | S4 | S6 | S9 | S11 |
| 7 | S3 | S5 | S7 | S10 | S13 |
| 8 | S3 | S5 | S8 | S12 | S15 |
| 9 | S3 | S6 | S9 | S13 | S17 |

From Table 1 it can be seen how any variation up to twice the MPEG frame decode rate may be displayed by using a pattern of changes between successive MPEG frames and between the input sequence images within them. The pattern may or may not be repeating and will depend on, amongst other things, whether the displayed image update rate is constant or changing.

The effect of this in the example described earlier is that the image update rate can be maintained over a wider range of simulated car speeds. If the image sequence is initially produced for a car speed of 50 kmh (perhaps by attaching a camera to a car travelling at 50 kmh around a race track) then simulated vehicle operation in the range 50 to 100 kmh will result in a full 25 Hz rate of presentation of new images. As the speed reduces below 50 kmh then the update rate of new images will slow. In the case of a 10 kmh speed, which in the example above produced an unacceptable image update rate of 2.5 Hz we seen an improved 5 Hz update rate.

In use, the selection of the next image frames includes selecting which area of the coded frame M to read from and/or selecting the next coded frame. As each operation takes a finite time, it is preferable to minimise situations where both operations are required between two successive image frames, by optimising the arrangement of image frames with reference to the most likely speed required. The layout of FIG. 2 is optimised for running at maximum speed (i.e Rate=2; Table 1) where the skipping of every other image frame means that the operation of selecting which area of the coded frame to read from is not required as it is the same from frame to frame. At medium rate (Rate=1) however, both operations are required every alternate image frame, following S2, S4, S6 etc.

An alternate arrangement optimised for speeds at or below Rate=1 inverts the arrangement of image frames in every alternate coded frame of FIG. 2 such that the first image frame in a coded frame is in the same position as the last image frame of the preceding frame. Consequently, where the full image sequence is displayed, there is never a need to select image frame position when selecting next image frame and vice versa. At speeds above Rate=1 however, both selections are required to be made or more irregular sample patterns (still averaging out at the desired rate) have to be used.

This latter arrangement is particularly useful where image frame skipping is not provided for and the maximum refresh rate corresponds to Rate=1, in other words where every image frame appears at least once. Having all image frames displayed one or more times, acceleration and deceleration of the refresh rate may be handled more easily and smoothly as it is a relatively simple matter to arrange to repeat an image frame at short notice, whereas attempting to recapture a dropped frame is altogether more problematical.

Figure 4:
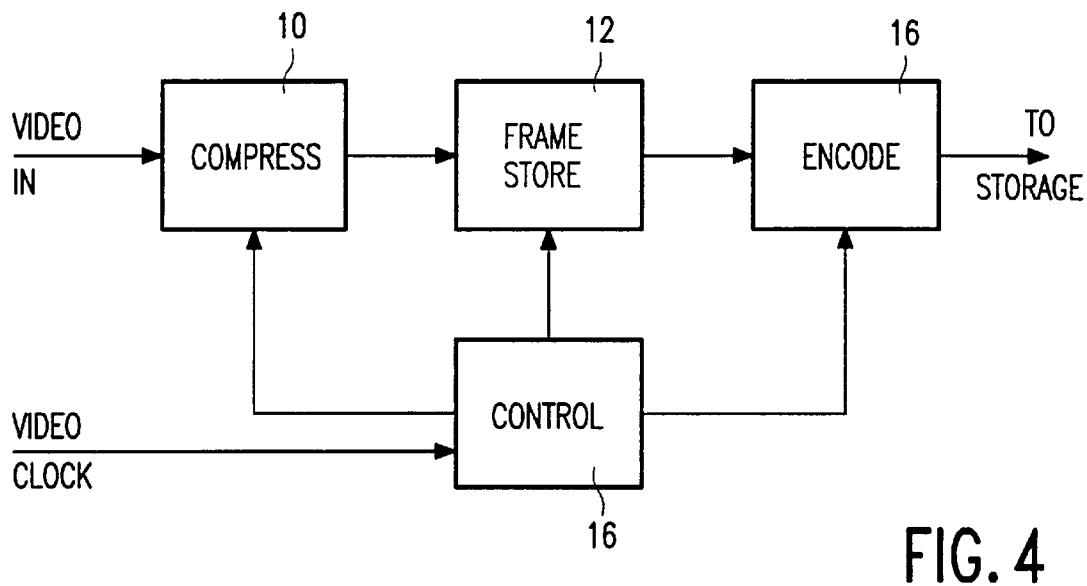
FIG. 4 is a diagram of encoder apparatus embodying the invention.

A suitable form of encoder for the system is shown in FIG. 4, with a received sequence of video image frames being input to a compression stage 10 where they are reduced in size to occupy an area determined by the number to be included in a further (MPEG) frame. For the example of FIG. 2, each image frame (S1, S2 etc) is reduced to occupy an area no larger than half that of the MPEG frame M1. There are a number of known techniques for reducing the area of a frame and suitable one would be, where the image frame is composed of a number of vertically aligned horizontal lines of pixels, to perform block averaging of successive groups of n lines to produce a single line of averaged pixel values. A cruder technique would be to omit n-1 out of every n lines to achieve an n times reduction in vertical height of the image, although this is not preferred due to aliasing effects that it will introduce.

Forming the compressed input frames into MPEG frames may suitably be done by reading them sequentially into a frame store memory device 12 and, every n input frame periods, reading the contents of the store out to an encoder stage 14 under control of an encoder control unit 16 clocked in synchronism with the input video rate. The encoder stage 14 configuration will depend on the particular coding scheme employed: for a predictive coding scheme according to the MPEG standard it will typically comprise a number of frame memories and comparators as will be understood by the skilled practitioner.

Whilst shown in FIG. 4 as a clocked hardware device, it will be understood that the encoding procedure may be carried out off-line wholly or partially in a software implementation. In such a case, the stages of compression 10 and encoding 14 may be considered as arithmetical manipulations of digital video data streams.

Following encoding, the MPEG data stream is then stored in an appropriate form, such as recording onto a compact disc. Where the data stream is to be decoded by a decoder having an adaptable capability for handling MPEG frames containing differing numbers of input sequence frames, the data stream stored preferably includes data specifying the arrangement of the input sequence frames.

Figure 5:
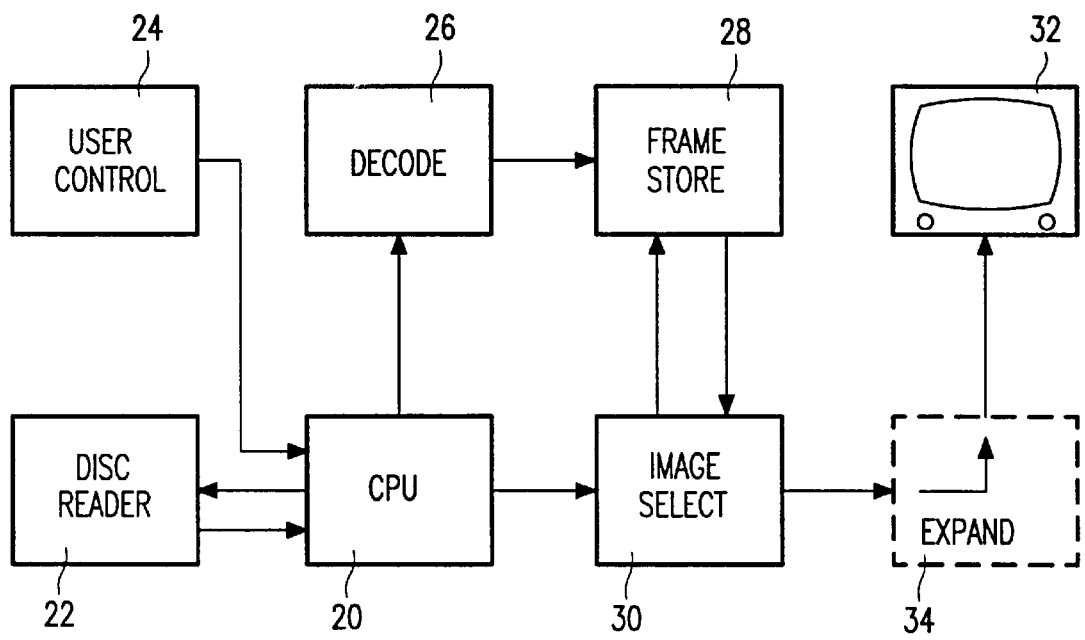
FIG. 5 is a block diagram of a decoding and display apparatus for use with the frame sequence of FIG. 2.

A decoder and display architecture for an interactive system is shown in FIG. 5. The system CPU 20 obtains the encoded MPEG data stream from on-disc storage by triggering read out of successive frames by disc reader 22 at a rate determined by a rate signal input to the CPU from a user control 24. The user control 24 may be any suitable form of input device such as a keyboard, mouse or joystick. Returning to the example of the travelling car, the rate signal may represent a current or desired speed or acceleration on the basis of which the CPU calculates the appropriate display image update rate for the instantaneous vehicle speed and the corresponding required frame read-out rate from the disc reader 24. Following read-out, the MPEG image frames are passed to a decoder stage 26 which applies the appropriate decoding to recreate the sequence of full MPEG image frames such as that of FIG. 2. This sequence is then stored in a random access frame store memory 28 with a set pattern of memory address allocation to MPEG frame position: in this way, the area of an MPEG frame corresponding to an included input sequence frame may be simply read out from known memory addresses.

The reading out of required input sequence frames from the frame store 28 is carried out by image select unit 30 under control of the CPU 20, with the image select unit 30 outputting a display image frame sequence comprising selected input sequence frames (such as those shown in Table 1) at the required frame rate for display on television unit 32. If the display image frames are to occupy an area of the television screen corresponding to their compressed size, no further treatment of the frames is required. If the frames are to cover a larger area of the screen, an expansion unit 34 may be provided between the image select unit 30 and television 32 to "stretch" the frames as required. Techniques for expanding images will be known to the skilled practitioner and may, for example, include distributing the image data over a wider area and using filtering techniques such as linear or nonlinear interpolation to generate intermediate values or may simply comprise repeating blocks of data to fill gaps. An important consideration for the expansion unit 34 is that, whichever technique is used, it must not unduly delay display of images to the extent that a noticeable interval occurs between the user setting a rate value and that value being implemented in the display.

It will be understood that the technique described trades image area or resolution against image display rate. In the example of FIG. 2, the effect of halving the image area is to maintain full display rate over a two to one speed range and to double the update rate when the speed drops below this rate. As mentioned, it would also be possible to pack more than two images into each MPEG frame. If three images were packed per frame then the speed ratio over which the full rate image updated could be supported would be increased to a factor of three range and the improvement in image update rate when the speed falls below this range would be a factor of three.

From reading the present disclosure, other modifications will be apparent to persons skilled in the art. Such modifications may involve other features which are already known in the design, manufacture and use of video signal encoding and decoding systems and devices and component parts thereof and which may be used instead of or in addition to features already described herein. Although claims have been formulated in this application to particular combinations of features, it should be understood that the scope of the disclosure in the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method for encoding a sequence of video images comprising the steps of:
   a) for each of n successive image frames, where n is an integer greater than 1, spatially compressing the frame to less than or equal to 1/n times its original area; and
   b) arranging the n spatially compressed frames in a non-overlapping manner in a further image frame,
   steps a) and b) being performed for successive groups of n images of the video image sequence to be encoded, and the resultant sequence of further image frames then being encoded using a predetermined image sequence coding scheme.

2. A method as claimed in claim 1, wherein each of the n image frames is subjected to vertical compression and the n frames are then arranged in vertical alignment in the further image frame.

3. A method as claimed in claim 2, wherein the encoded sequence of further image frames is modified to include data specifying the arrangement of the n image frames within each further image frame.

4. A method as claimed in claim 1, wherein the encoded sequence of further image frames is modified to include data specifying the arrangement of the n image frames within each further image frame.

5. A method as claimed in claim 1, wherein the first of each group of n spatially compressed frames is positioned in a further image frame at a location corresponding to the last of the group of n spatially compressed frames in the preceding further image frame.

6. A method of decoding a sequence of video images encoded by the method of claim 1, comprising the steps of:
   a) decoding the encoded sequence, according to the predetermined coding scheme, to recreate the sequence of further image frames;
   b) determining a desired display image refresh rate; and
   c) generating a constant frame rate display image sequence by selecting one or more compressed image frames from each further image frame in dependence on the desired display image refresh rate.

7. A method as claimed in claim 4, wherein, where the desired display image refresh rate is below a predetermined threshold rate, all of the spatially compressed images are selected for display with one or more of them being displayed twice or more in succession, and where the desired display image refresh rate is above the threshold, one or selected ones from the sequence of spatially compressed frames are omitted from the display image sequence.

8. A method as claimed in claim 4, wherein for a predetermined maximum value of desired display image refresh rate, the display image sequence comprises one spatially compressed image from each successive further image frame.

9. Interactive decoding apparatus operable to decode for display a sequence of video images encoded by the method of claim 1, the apparatus comprising:
   signal input means arranged to receive the encoded sequence;
   decoder means connected to the signal input and operable to decode the received sequence, according to the predetermined sequence coding scheme, to generate a sequence of the further image frames;
   user input means arranged to output a rate signal, determined by user input, within a specified range and indicative of a desired display image refresh rate; and
   image selection means coupled to the decoder means and the user input means and operable to generate a constant frame rate display image sequence by selecting one or more compressed image frames from each further image frame in dependence on the rate signal.

10. Apparatus as claimed in claim 9, further comprising expansion means connected to receive the selected compressed frames from the image selection means and operable to expand each received compressed frame by use of a filter.

11. Apparatus for encoding a sequence of video images, the apparatus comprising:
    input means for receiving a sequence of video image frames;
    compression means connected to receive successive frames from the input and reduce each to less than or equal to 1/n times its original area, where n is an integer greater than one;
    frame arrangement means connected to the compression means and operable to take n successive spatially compressed frames and arrange them in non-overlapping manner in a further image frame; and
    frame encoder means coupled to receive the further image frames output from the frame arrangement means and operable to encode the said further image frames according to a predetermined image sequence coding scheme.

12. Apparatus as claimed in claim 11, wherein each input video image frame is composed of a plurality of vertically aligned horizontal lines and the compression means is arranged to vertically compress a frame by generating a horizontal line of averaged pixel values for each successive group of n lines.

13. Apparatus as claimed in claim 11, wherein the frame arrangement means comprises a sequential memory device into which the image data for the n spatially compressed frames is sequentially written.

* * * * *